D. Dick,
Burning Hydrocarbon.
N° 36,769. Patented Oct. 28, 1862.
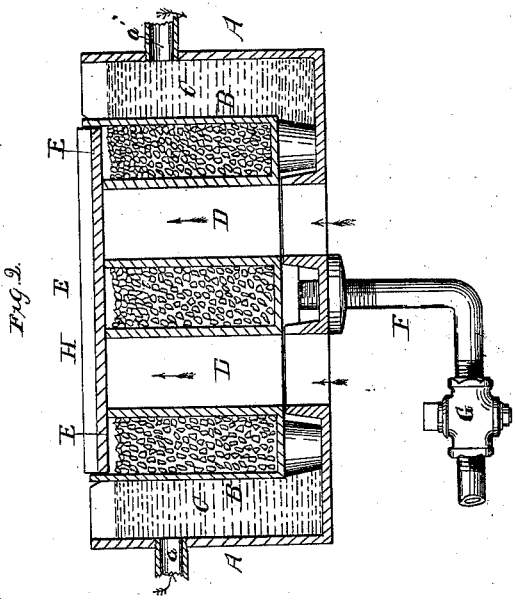
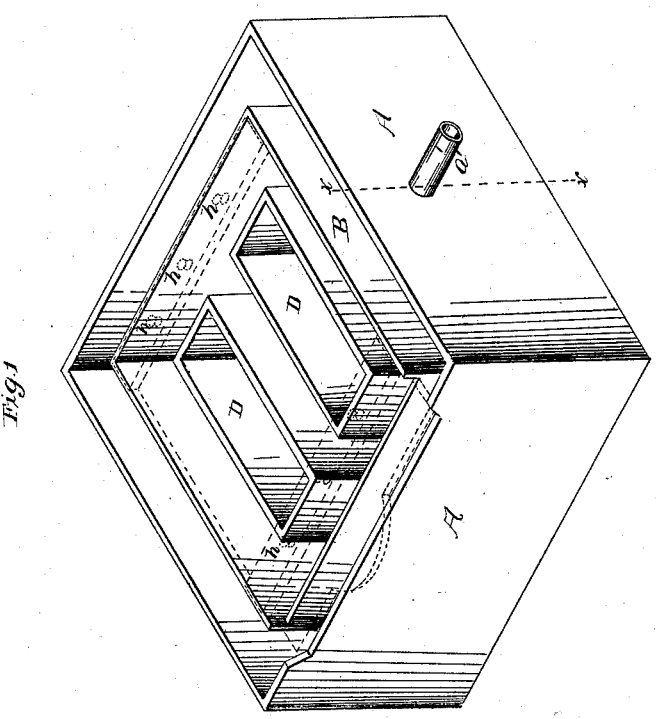
Witnesses:
Inventor:
David Dick

UNITED STATES PATENT OFFICE.

DAVID DICK, OF MEADVILLE, PENNSYLVANIA.

IMPROVEMENT IN APPARATUS FOR USING MINERAL OILS AS FUEL.

Specification forming part of Letters Patent No. 36,769, dated October 23, 1862.

*To all whom it may concern:*

Be it known that I, DAVID DICK, of Meadville, in the county of Crawford and State of Pennsylvania, have invented certain new and useful Improvements in Apparatus for Using Mineral Oils as a Fuel for the Generation of Steam, and for other Purposes, of which the following is a full, clear, and exact description, reference being had to the accompanying drawings, which make part of this specification, and in which—

Figure 1 represents a view in perspective of so much of a mineral-oil furnace embracing my improvements as is necessary to illustrate my invention, and Fig. 2 a vertical section through the same at the line *x x* of Fig. 1.

It is the object of my invention to provide means whereby coal-oil, petroleum, or other mineral oils may advantageously and economically be employed as a fuel for generating steam,' and for other purposes; to which end the improvements claimed under this patent consist, first, in the use of pumice-stone or other equivalent suitable porous and incombustible material, through which the air is caused to flow and upon the surface of which it is ignited; secondly, in combining with a furnace in which mineral oil is used as fuel a water-chamber which surrounds the fire-box, in order to prevent the generation of gas below the surface of the oil; thirdly, in a novel mode of combining the water-chamber, the fire-box, and the flues through which air is supplied to the furnace, as hereinafter described; fourthly, in an extinguisher-plate which can be placed over the furnace when desired to exclude the air therefrom, and thus extinguish the fire; fifthly, in perforating said plate with a series of holes, which permit the gas generated after the fire is extinguished to escape, but which are too minute to allow the passage of flame.

In the accompanying drawings, which represent a convenient arrangement for carrying out the objects of my invention, the furnace is shown as consisting of a water-tight metallic box-casing or water-chamber, A, within which a similar box, B, of smaller size, is placed, the space between the two forming a chamber, C, which is kept filled with water, in order to prevent the fire-box B from becoming too much heated. In this instance the water enters the chamber through one ($a$) of the pipes and flows out at the other, ($a'$,) as shown by the arrows in Fig. 2. Under some circumstances, however, the feed-water for the boilers might be forced through the water-chamber, and thus be heated before entering them. In cases where the furnace is liable to agitation, as in locomotive or marine engines, the water-chamber C should be tightly closed in order to prevent waste. Air is supplied to the flame in this instance through tubes, flues, or channels, D, passing up through the bottom of the furnace.

For convenience of construction, the two boxes A and B may be made separately, as shown in Fig. 2; but in such cases the joint which connects them should be perfectly tight. The space around the air-tubes D is filled with some porous incombustible or refractory material, E. Ashes, sand, gravel, bricks, crushed pottery, asbestus, magnesia, pumice-stone, and other materials of like nature may be used for this purpose; but my experiments lead me to prefer pumice-stone. The material may be used in solid blocks to advantage; but I prefer to use it crushed into small lumps about the size of a pea. The oil enters the box at any suitable point through a supply-pipe, F, provided with a cock or valve, G, to regulate its flow. It may under some circumstances require to be forced into the fire-box by a pump; but, generally speaking, if the tank be situated above the level of the top of the fire-chamber, the hydrostatic pressure alone will be sufficient for this purpose. As the oil enters the fire-box it percolates through the porous material, which allows it to pass freely, and yet prevents it from dashing about and being spilled over the edges of the furnace, which is a matter of essential importance in locomotive and marine engines. The oil, when ignited, burns freely upon the surface of the porous material. The water by which the fire-chamber is surrounded prevents the furnace from becoming heated and generating gas in the bottom of the fire-box, which might, under certain circumstances, be dangerous.

In order to extinguish the flame when desired, I employ an extinguisher-plate, H. (Shown in red lines in Fig. 1 and in blue section-lines in Fig. 2.) The plate in this instance slides over the top of the furnace, and cuts off the supply of air by closing the air-tubes D.

As the heat of the furnace would cause the generation of gas from the oil for some time after the flame was extinguished, I make a series of small holes, h, Fig. 1, in the extinguisher-plate H, of a size sufficient for the escape of gas, but too minute for the passage of the flame.

I do not limit myself to the precise arrangement hereinbefore described, for it is obvious that the details of my apparatus may be modified in various ways without departing from the spirit of my invention, which modifications would readily suggest themselves to a skillful mechanic after seeing my invention.

What I claim as my invention, and desire to secure by Letters Patent, is—

1. The employment, in a mineral-oil furnace, of pumice-stone or other equivalent porous incombustible material, through which the oil flows and upon the surface of which it is burned, substantially in the manner described, for the purposes set forth.

2. The combination of a furnace in which mineral oils are employed as fuel with a water-space surrounding the same, substantially in the manner described, for the purpose of preventing the overheating of the furnace and the consequent generation of gas in the fire-box, as set forth.

3. The combination, in a mineral-oil furnace, of a water-chamber, a fire-box, and a series of air-flues, substantially in the manner and for the purposes described.

4. The combination of an extinguisher-plate with a fire-box and air-tubes, substantially as and for the purpose specified.

5. Perforating the extinguisher-plate, as described, for the purpose of permitting the escape of the gas and preventing the entrance of air, as set forth.

In testimony whereof I have hereunto subscribed my name.

DAVID DICK.

Witnesses:
J. SNOWDEN BELL,
WM. D. BALDWIN.